United States Patent [19]

Jones

[11] Patent Number: 5,783,991
[45] Date of Patent: Jul. 21, 1998

[54] METHOD OF DETECTING A DEFLATED TIRE ON A VEHICLE

[75] Inventor: David Jones, Lichfield, England

[73] Assignee: Sumitomo Rubber Industries, Ltd., Hyogo-ken, Japan

[21] Appl. No.: 796,540

[22] Filed: Feb. 6, 1997

[30] Foreign Application Priority Data

Feb. 7, 1996 [GB] United Kingdom ............ 9602442

[51] Int. Cl.$^6$ ..................................... B60C 23/00
[52] U.S. Cl. .................. 340/444; 340/442; 73/146.5
[58] Field of Search ........................... 340/442, 444, 340/671, 443; 73/146.5, 146.2

[56] References Cited

U.S. PATENT DOCUMENTS

| | | | |
|---|---|---|---|
| 5,239,469 | 8/1993 | Walker et al. | 364/424.03 |
| 5,248,957 | 9/1993 | Walker et al. | 340/444 |
| 5,252,946 | 10/1993 | Walker et al. | 340/444 |
| 5,345,217 | 9/1994 | Prottey | 340/442 |

FOREIGN PATENT DOCUMENTS

| | | |
|---|---|---|
| 0647536 | 4/1995 | European Pat. Off. . |
| 0657313 | 6/1995 | European Pat. Off. . |
| 0751018 | 1/1997 | European Pat. Off. . |

*Primary Examiner*—Jeffery A. Hofsass
*Assistant Examiner*—Daryl C. Pope
*Attorney, Agent, or Firm*—Birch, Stewart, Kolasch & Birch, LLP

[57] ABSTRACT

A method of detecting a deflated tire on a vehicle by comparing the rolling radii of the tires by comparing angular velocity speed signal values from wheel speed sensors provided on each of the wheels wherein whenever the tires are re-inflated or changed, a semi-automatic standardization procedure is initiated by the driver to enable the deflation warning system to automatically recalibrate the relative wheel speed signals.

12 Claims, 1 Drawing Sheet

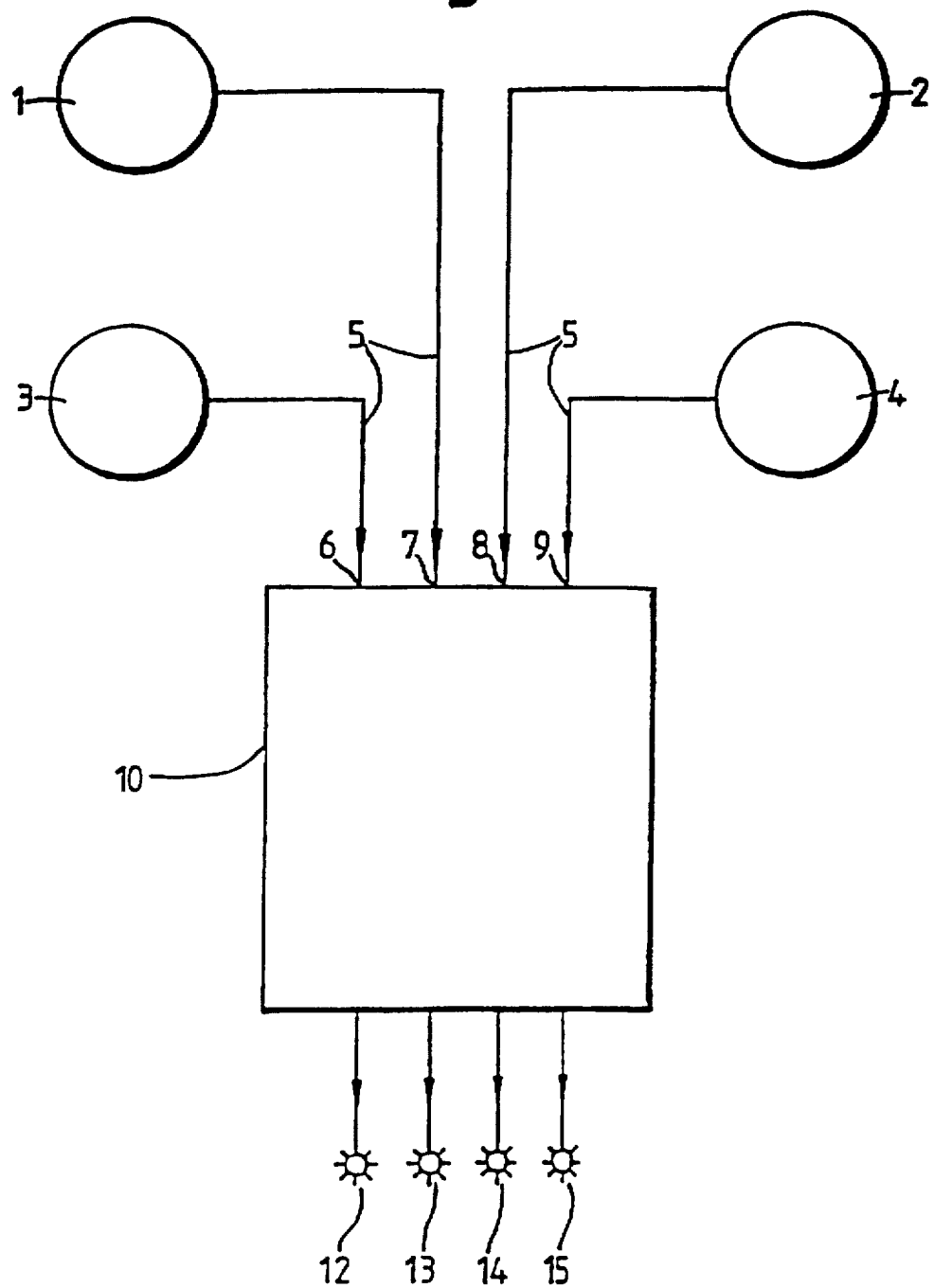

METHOD OF DETECTING A DEFLATED TIRE ON A VEHICLE

BACKGROUND OF THE INVENTION

The present invention relates to a method of detecting a deflated tire on a vehicle which is suitable for cars, trucks, buses and the like.

Prior art methods detect a deflated or partially deflated tire on a vehicle by comparing the rolling radii of the tires. These systems utilize wheel speed signals such as for example the signals from an anti-lock braking system (ABS) which are multipulse signals of typically 48 to 96 pulses per wheel revolution. The prior methods compare these signals in various ways to determine if one wheel is rotating significantly faster than the others which indicates a reduced tire rolling radius and hence a partially or wholly deflated tire on that wheel.

One difficulty with the prior art systems arises from the fact that the rolling radii of tires which might be fitted to the vehicle may vary by amounts which far exceed the differences produced by a deflation.

For example new tire design tolerances set out by the European Tire and Rim Technical Organization (ETRTO) allow for a variation in overall inflated diameter of up to 12% of the tire sectional height. Thus for example in the case of 165R13 tires correctly inflated on a passenger car there may be up to a maximum of 3% difference in wheel speed between tires on the maximum and minimum tolerances.

In comparison it has been found for 13" car radial tires of the normal steel breaker type, the increase in rotational speed due to a pressure loss of 1.2 bar is only 0.27%, i.e. an order of magnitude less than the effect due to tire size tolerances.

Thus it is important for the successful operation of a deflation warning system that the system be capable of re-standardization whenever changes to the tires are made.

SUMMARY OF THE INVENTION

Accordingly it is an object of the present invention to provide a method and system for warning of a deflated tire on a vehicle which enables the driver to initiate re-standardisation of the system whenever changes to the tires fitted to the vehicle have occurred, while continuing to provide a deflation warning.

Accordingly, the present invention provides a method of detecting a deflated tire on a vehicle by comparing the rolling radii of the tires by means of comparing angular velocity speed signal values C1, C2, C3 and C4 from wheel speed sensors on wheels 1–4 at the left-hand front, right-hand front, left-hand rear and right-hand rear wheel positions respectively, comprising the step of calculating an error value DEL' in normal driving by processing the four angular velocity speed signal values C1–C4 in a central processing unit which subtracts the sum of the signal values from one pair of diagonally opposite wheels from the sum of the signal values from the other pair of diagonally opposite wheels and expressing the result as a percentage of the mean of the sums $$DEL'=(C1+C4-C2-C3)\times 50/((C1+C2+C3+C4)/),$$

sensing when the magnitude of the error value DEL' is between a DEL'MIN value of 0.05 and a DEL'MAX value of 0.5 and when it is carrying out the step of deciding which tire is apparently deflated by a comparison of the angular velocity speed signal values C1–C4 with each other, and operating a tire warning indicator in the vehicle to warn the driver the that particular tire is deflated, wherein a semi-automatic standardisation procedure initiated by the driver comprising firstly recording a data-set DS of four values Ct1–Ct4 comprising the total wheel speed signal values C1–C4 for each wheel 1–4 in a predetermined time period t, secondly deciding if the data-set DS is acceptable or unacceptable, repeating the said recording and deciding when a predetermined number N of acceptable data-sets Ds have been accumulated, deriving wheel speed factors FAW(1)–FAW(4) for each of the four wheels 1–4 respectively by dividing the accumulated overall total number of wheel speed signal values C1–C4 of each wheel 1–4 by the accumulated overall total wheel speed signal values of any one of the wheels 1–4, and subsequently in normal driving, correcting the four wheel speed signal values C1–C4 by dividing each value by its respective wheel speed factor FAW(1)–FAW(4) and using these corrected wheel speed values to calculate the error value DEL'.

The method may also provide a warning that an unsuitable tire such as a temporary spare or a tire of an inappropriate size has been fitted.

BRIEF DESCRIPTION OF THE DRAWINGS

Further aspects of the present invention will become apparent from the following description of one embodiment, by way of example only in conjunction with the attached diagrammatic drawing in which:

FIG. 1 is a schematic diagram showing a deflation warning device for a car having four wheels.

DETAILED DESCRIPTION OF THE INVENTION

The apparatus shown in FIG. 1 provides a deflation warning device for a vehicle having four wheels 1, 2, 3 and 4. Wheels 1 and 2 are the left- and right-hand front wheels respectively and wheels 3 and 4 are the left- and right-hand rear wheels respectively. Each wheel has a toothed wheel device associated with it of the type designed and fitted to provide a digital signal comprising a magnetic pick-up of the type used for a vehicle anti-skid system of the electronic type often commonly known as ABS braking system. Each pick-up is additionally connected in this case to a deflation warning detection system which uses the same digital signal as the ABS system.

The electronic signals from each of the four wheels are carried through cables 5 to four separate inputs 6, 7, 8 and 9 of a central processing unit 10. Four separate indicator lights 12, 13, 14 and 15 are provided one for each wheel 1, 2, 3 and 4. These indicator lights may be most conveniently mounted on the vehicle dashboard.

The central processing unit 10 is basically a microprocessor which monitors the four signals and compares them to determine if an outward signal is to be sent to operate an indicator light to warn of a deflated tire. In the case where the vehicle already has an ABS system fitted, then the microprocessor 10 may be the same microprocessor as the ABS system. Alternatively, a separate microprocessor may be provided.

The respective values of the total digital pulse signals from each of the wheels 1, 2, 3 and 4 in a five second period are C1, C2, C3 and C4 respectively. The central processing unit 10 computes these frequency values as will be described below to determine whether or not to send a deflation warning signal to one of the warning lights 12, 13, 14 or 15.

The method of the present invention proceeds in normal driving by processing the four angular velocity speed signal values C1–C4 in the central processing unit 10 to determine an error value DEL' by subtracting the sum of the signal values from one pair of diagonally opposite wheels from the sum of the signal values from the other pair of diagonally opposite wheels and expressing the result as a percentage of the mean of the sum of the sums, i.e. for example $$DEL'=(C1+C4-C2-C3)\times 50/[(C1+C2+C3+C4)/4]$$

The central processing unit 10 then carries out the step of determining whether or not the error value DEL' is between a minimum value DEL'MIN of 0.05 and a maximum value of DEL'MAX of 0.5.

In the event that DEL' is between DEL'MIN and DEL'MAX then the central processing unit compares each of the angular velocity speed signals C1–C4 with each other to determine which wheel is apparently rotating faster than the others. The central processing system 10 then operates the corresponding indicator light 12, 13, 14 or 15 to indicate to the driver that that particular tire is deflated.

According to the present invention, whenever the tires on the vehicle are reinflated or changed in any way such as particularly fitting a new tire or a temporary spare, a standardisation procedure is initiated by the vehicle driver which enables the deflation warning system to automatically recalibrate the relative wheel speed signal.

In the standardisation procedure the central processing unit 10 records in normal driving a data-set DS of four values Ct1–Ct4 representing the total wheel speed signal values for each wheel 1–4 respectively in a predetermined time period t. The predetermined time period t may be 5 seconds, as is used normally by the system in the detection of a deflated tire, or it may be a different time.

The central processing unit then decides if the data-set of the four values Ct1–Ct4 are acceptable or unacceptable. Unacceptable data may for example result from prolonged extreme vehicle behavior such as wheel-spin or wheel-lock.

The method by which the central processing unit 10 decides whether the data is acceptable or unacceptable comprises determining a deciding error value DECDEL' from the data set DS of the four values Ct1–Ct4 by subtracting the sum of the values of one pair of diagonally opposite wheels from the sum of the other pair of diagonally opposite wheels and expressing the result as a percentage of the mean of the sum of the two sums, i.e. for example $$DECDEL'=(Ct1+Ct4-Ct2-Ct3)\times 50/[(Ct1+Ct2+Ct3+Ct4)/4]$$

The central processing unit then compares the value of the deciding error value DECDEL' with the prespecified maximum error value DEL'MAX and if DECDEL' is less than three times DEL'MAX the data-set DS is accepted.

The steps of recording a data-set DS and then deciding if the data-set is acceptable are repeated until a predetermined number N of, for example 1000, acceptable data-sets DS have been obtained.

The standardization procedure then continues with the determination of four wheel speed factors FAW(1)–FAW(4), one for each of the vehicle wheels 1–4 respectively. The wheel speed factors for the wheels are obtained by summing the wheel speed signal values for each particular wheel from the predetermined number N of acceptable data-sets DS, and dividing these four accumulated overall totals by the accumulated overall total for one of the wheels. Thus for example if the accumulated overall totals of the wheel speed signal values Ct1–Ct4 are respectively ACt1, ACt2, ACt3 and ACt4 then the four wheel speed factors FAW(1)–FAW(4) may be respectively:

$$1, \quad \frac{ACt2}{ACt1}, \quad \frac{ACt3}{ACt1}, \quad \frac{ACt4}{ACt1}$$

$$\text{or} \quad \frac{ACt1}{ACt2}, \quad 1, \quad \frac{ACt3}{ACt2}, \quad \frac{ACt4}{ACt2}$$

$$\text{or} \quad \frac{ACt1}{ACt3}, \quad \frac{ACt2}{ACt3}, \quad 1, \quad \frac{ACt4}{ACt3}$$

$$\text{or} \quad \frac{ACt1}{ACt4}, \quad \frac{ACt2}{ACt4}, \quad \frac{ACt3}{ACt4}, \quad 1$$

Accordingly on completion of the standardisation procedure the relative speeds of the wheels of the vehicles in normal driving are known from the four wheel speed factors FAW(1)–FAW(4).

Henceforth in the normal operation of the deflation warning method the normally monitored wheel angular velocity speed signal values C1–C4 are first corrected by dividing by the respective wheel speed factor FAW(1)–FAW(4) in order to normalise the four values C1–C4 before they are used in calculating the error value DEL'. Accordingly, differences in the wheel speed due to different tire rolling radii are removed prior to the detection of a deflated tire.

During the period of accumulating acceptable data-sets DS the deflation warning system continues to operate but a warning is only given if the error value DEL' exceeds three times the minimum error value DEL'MIN. Also during this period if a significant proportion of the data-sets DS are found unacceptable then an extra warning may be given to the driver that the standardisation process is not operating normally or is unable to be carried out and that the deflation warning system is not operating within its normal limits. In a preferred method this extra warning is given if after 10% of the predetermined number of acceptable data-sets DS have been accumulated in excess of 60% of the monitored data-sets DS have been found unacceptable.

In a preferred method of the present invention the step of deciding if the data-set DS of the four values Ct1–Ct4 is acceptable or unacceptable comprises the further steps of determining from the data-set DS a lateral acceleration factor LAT as will now be explained.

From the four speed signal values Ct1, Ct2, Ct3 and Ct4 respective first, second, third and fourth deciding factors MC1, MC2, MC3, MC4 are determined wherein

```
MC1 = Ct1
MC2 = Ct2/[(Ct2+Ct4)/(Ct1+Ct3)]
MC3 = Ct3/[(Ct3+Ct4)/(Ct1+Ct2)]
MC4 = Ct4/[[(Ct2+Ct4)/(Ct1+Ct3)]×[(Ct3+Ct4)/(Ct1+Ct2)]]
```

The four deciding factors are then summed and this sum is multiplied by a centralising constant K which may have a value in the range of 0.250125 to 0.250625 to give a central deciding factor MPSD. The preferred value of K is 0.2505. The lateral acceleration factor LAT is then determined as follows,
if the first or second deciding factor MC1 or MC2 is greater than the central deciding factor MPSD then $$LAT=2\times(Ct3-Ct4)\times(Ct1+Ct2+Ct3+Ct4)/[4\times(KPHFAC)^2]$$

if the third or fourth deciding factor MC3 or MC4 is greater than the central deciding factor MPSD then $$LAT = 2 \times (Ct1-Ct2) \times (Ct1+Ct2+Ct3+Ct4)/[4\times(KPHFAC)^2]$$

or if none of the deciding factors MC1, MC2, MC3 or MC4 is greater than the central deciding factor MPSD then $$LAT = (Ct1+Ct3-Ct2-Ct4) \times (Ct1+Ct2+Ct3+Ct4)/[4\times(KPHFAC)^2]$$

wherein KPHFAC is the number of wheel speed signals per wheel speed sensor per unit of speed.

Thus having determined a value for the lateral acceleration factor LAT, the data-set DS is accepted only if the value of LAT is less than 600. Incorporation of this additional condition prevents acceptance of wheel speed signal values under extremes of vehicle cornering which may distort the data.

In a more preferred method of the invention during the standardisation procedure after 10% of the predetermined number N of acceptable data-sets DS have been accumulated in a first stage then during a second stage of the procedure subsequent data-sets DS are accepted only if the deciding error value DECDEL' is less that 1.5 times the maximum error value and DEL'MAX and/or only if the value of LAT is less then 300. In this more preferred method a deflated tire warning is given during this second stage of standardisation procedure when the error value DEL' exceeds 1.5 times the minimum error value DEL'MIN.

In a most preferred method the standardisation procedure comprises in addition to the first and second stages a third stage in which after 30% of the predetermined number N of acceptable data-sets DS have been accumulated subsequent data-sets DS are accepted only if the deciding error value DECDEL' is less than the maximum error value DEL'MAX and/or the value of LAT is less than 200. In this most preferred method in the third stage a deflated tire warning is given if DEL' exceeds the minimum error value DEL'MIN.

Accordingly the present invention provides a method of detecting a deflated tire on a vehicle which avoids false warnings due to differences in the rolling radii of the tires fitted to the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described my invention What I claim is:

1. A method of detecting a deflated tire on a vehicle by comparing the rolling radii of the tires by means of comparing angular velocity speed signal values C1, C2, C3 and C4 from wheel speed sensors on wheels 1–4 at the left-hand front, right-hand front, left-hand rear and right-hand rear wheel positions respectively, comprising the step of:

calculating an error value DEL' in normal driving by processing the four angular velocity speed signal values C1–C4 in a central processing unit which subtracts the sum of the signal values from one pair of diagonally opposite wheels from the sum of the signal values from the other pair of diagonally opposite wheels and expressing the result as a percentage of the means of the sums $$D1' = (C1+C4-C2-C3) \times 50/((C1+C2+C3+C4)),$$

sensing when the magnitude of the error value DEL' is between a DEL'MIN value of 0.05 and a DEL'MAX value of 0.5 and when it is carrying out the step of deciding which tire is apparently deflated by comparison of the angular velocity speed signal values C1–C4 with each other, and operating a tire warning indicator in the vehicle to warn the driver that the particular tire is deflated, wherein a semi-automatic standardization procedure initiated by the driver comprising firstly recording a data-set DS of four values Ct1–Ct4 comprising the total wheel speed signal values C1–C4 for each wheel 1–4 in a predetermined time period t, secondly deciding if the data-set DS is acceptable or unacceptable, repeating the said recording and deciding until a predetermined number N of acceptable data-sets DS have been accumulated, driving wheel speed factors FAW(1)–FAW(4) for each of the four wheels 1–4 respectively by dividing the accumulated overall total number of wheel speed signal values Ct1–Ct4 of each wheel 1–4 by the accumulated overall total wheel speed signal values of any one of the wheels 1–4, and subsequently in normal driving correcting the four wheel speed signal values C1–C4 by dividing each value by its respective wheel speed factor FAW(1)–FAW(4) and using these corrected wheel speed values to calculate the error value DEL'.

2. The method according to claim 1, wherein the step of deciding if the data-set DS is acceptable or unacceptable comprises:

calculating a deciding error value DECDEL' from the data-set of four values Ct1–Ct4 wherein DECDEL'= $(Ct1+Ct4-Ct2-Ct3) \times 50/((Ct1+Ct2+Ct3+Ct4)/4)$.

comparing the deciding error value DECDEL' with the maximum error value DEL'MAX of the error value DEL' and if DECDEL' is less than 3 times DEL'MAX then accepting the data-set DS, a warning of a deflated tire being given only when the error value DEL' exceeds 3 times the minimum error value DEL'MIN.

3. The method according to claim 2, wherein after 10% of the predetermined number N of acceptable data-set Ds have been accumulated then subsequent data-sets are accepted only if the deciding error factor DECDEL' is less than 1.5 times the maximum error value DEL'MAX and a deflated tire warning is given when the error value DEL' exceeds 1.5 times the minimum error value DEL'MIN.

4. The method according to claim 3, wherein after 30% of the predetermined number N of acceptable data-set DS have been accumulated then subsequent data-sets are accepted only if the deciding error factor DECDEL' is less than the maximum error value DEL'MAX.

5. The method according to claim 1, wherein the step of deciding if the data-set DS is acceptable or unacceptable comprises determining from the data-set DS of the four values Ct1–Ct4 of the four total wheel speed signal values a lateral acceleration factor LAT, by calculating from the four speed signal values Ct1, Ct2, Ct3 and Ct4 respective first, second, third and fourth deciding factors MC1, MC2, MC3, MC4 where $$MC1 = Ct1$$
$$MC2 = Ct2/((Ct2+Ct4)/(Ct1+Ct3))$$
$$MC3 = Ct3/((Ct3+Ct4)/(Ct1+Ct2))$$
$$MC4 = Ct4/(((Ct2+Ct4/Ct1+Ct3))\times((Ct3+Ct4)/(Ct1+Ct2)))$$

then summing the four deciding factors and multiplying this sum by a centralizing constant K having a value in the range of 0.250125 to 0.250625 to give a central deciding factor MPSD and selecting the lateral acceleration factor LAT as follows:

if the first or second deciding factor MC1 or MC2 is greater than the central deciding factor MPSD then $$LAT=2\times(Ct3-Ct4)\times(Ct1+Ct2+Ct3+Ct4)/(4\times(KPHFAC)^2);$$

if the third or fourth deciding factor MC3 or MC4 is greater than the central deciding factor MPSD then $$LAT=2\times(Ct1-Ct2)\times(Ct1+Ct2+Ct3+Ct4)/(4\times(KPHFAC)^2)$$

or if none of the deciding factors MC1, MC2, MC3 or MC4 is greater than the deciding factor MPSD then $$LAT=(Ct1+Ct3-Ct2-Ct4)\times(Ct1+Ct2+Ct3+Ct4)/(4\times(KPHFAC)^2)$$

wherein KPHFAC is the number of wheel speed signals per wheel speed sensor per unit of speed and accepting the data-set DS if the value of LAT is less than 600.

6. The method according to claim 5, wherein after 10% of the predetermined number N of acceptable data-sets Ds have been accumulated then subsequent data-sets are accepted only if the value of LAT is less than 300.

7. The method according to claim 6, wherein after 30% of the predetermined number N of acceptable data-sets DS have been accumulated then subsequent data-sets are accepted only if the value of LAT is less than 200.

8. The method according to claim 5, wherein the central deciding constant K has a value of 0.2505.

9. The method according to claim 1, wherein before the number of acceptable data-sets DS have reached 10% of the predetermined number N of acceptable data-sets, if a significant proportion of data-sets DS have been found unacceptable, then a warning is given to the driver that the standardisation process is unable to be carried out.

10. The method according to claim 9, wherein a significant proportion of data-sets is greater than 60%.

11. The method according to claim 1, wherein the predetermined number N of acceptable data-sets DS is 1000.

12. The method according to claim 1, wherein the predetermined time period t is 5 seconds.

* * * * *